United States Patent
Masculo et al.

(10) Patent No.: US 11,096,477 B2
(45) Date of Patent: Aug. 24, 2021

(54) METHOD AND SYSTEM FOR DETERMINING COMPLIANCE WITH A GUIDED CLEANING SESSION

(71) Applicant: KONINKLIJKE PHILIPS N.V., Eindhoven (NL)

(72) Inventors: Felipe Maia Masculo, Eindhoven (NL); Gerben Kooijman, Leende (NL); Toon Hardeman, 's-Hertogenbosch (NL); Vincent Jeanne, Migne Auxances (FR)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 285 days.

(21) Appl. No.: 16/348,286

(22) PCT Filed: Nov. 8, 2017

(86) PCT No.: PCT/EP2017/078537
§ 371 (c)(1),
(2) Date: May 8, 2019

(87) PCT Pub. No.: WO2018/087113
PCT Pub. Date: May 17, 2018

(65) Prior Publication Data
US 2019/0320785 A1    Oct. 24, 2019

Related U.S. Application Data

(60) Provisional application No. 62/420,230, filed on Nov. 10, 2016.

(51) Int. Cl.
A46B 15/00 (2006.01)
A61C 17/22 (2006.01)

(52) U.S. Cl.
CPC ...... *A46B 15/0006* (2013.01); *A46B 15/0038* (2013.01); *A61C 17/221* (2013.01); *A46B 2200/1066* (2013.01)

(58) Field of Classification Search
CPC ............ A46B 15/0006; A46B 15/0038; A61C 17/221
See application file for complete search history.

(56) References Cited

U.S. PATENT DOCUMENTS

| | | | |
|---|---|---|---|
| 2010/0323337 A1* | 12/2010 | Ikkink | A46B 15/0002 434/263 |
| 2011/0010876 A1* | 1/2011 | Iwahori | A46B 15/0012 15/22.1 |
| 2014/0065588 A1* | 3/2014 | Jacobson | A46B 17/08 434/263 |

FOREIGN PATENT DOCUMENTS

| | | |
|---|---|---|
| KR | 20160000263 | 1/2016 |
| WO | 2006137648 A1 | 12/2006 |

(Continued)

OTHER PUBLICATIONS

PCT/EP2017/078537, ISR and Written Opinion, dated Jan. 25, 2018.

*Primary Examiner* — Randall E Chin (57) ABSTRACT

A method (400) for determining a user's compliance with a guided cleaning session during use of an oral cleaning device (10) includes the steps of: (i) providing (410) an oral cleaning device including a sensor (28), a guidance generator (46), and a controller (30); (ii) providing (420), by the guidance generator, a guided cleaning session to the user; (iii) generating (430), at a first location during the guided cleaning session, sensor data from the sensor indicating a position or motion of the oral cleaning device; (iv) comparing (440) the generated sensor data to expected sensor data for the first location; and (v) generating (450), based on the comparison, an estimate of the user's compliance with the guided cleaning session.

15 Claims, 4 Drawing Sheets

(56) References Cited

FOREIGN PATENT DOCUMENTS

| WO | 2009107047 A1 | 9/2009 |
| WO | 2011077282 A1 | 6/2011 |
| WO | 2014202250 A1 | 12/2014 |
| WO | 2017109633 A1 | 6/2017 |

\* cited by examiner

FIG. 4

METHOD AND SYSTEM FOR DETERMINING COMPLIANCE WITH A GUIDED CLEANING SESSION

CROSS-REFERENCE TO PRIOR APPLICATIONS

This application is the U.S. National Phase application under 35 U.S.C. § 371 of International Application No. PCT/EP2017/078537, filed on Nov. 8, 2017, which claims the benefit of U.S. Provisional Patent Application No. 62/420,230, filed on Nov. 10, 2016. These applications are hereby incorporated by reference herein.

FIELD OF THE INVENTION

The present disclosure relates generally to systems and methods for determining a user's compliance with a guided cleaning session during use of an oral cleaning device.

BACKGROUND

Proper tooth cleaning, including length and coverage of brushing, helps ensure long-term dental health. Many dental problems are experienced by individuals who either do not regularly brush or otherwise clean their teeth or who do so inadequately, especially in a particular area or region of the oral cavity. Among individuals who do clean regularly, improper cleaning habits can result in poor coverage of cleaning and thus surfaces that are not adequately cleaned during a cleaning session, even when a standard cleaning regimen, such as brushing for two minutes twice daily, is followed.

To facilitate proper cleaning, it is important to ensure that there is adequate cleaning of all dental surfaces, including areas of the mouth that are hard to reach or that tend to be improperly cleaned during an average cleaning session. One way to ensure adequate coverage is to provide directions to the user guiding the use of the device, and/or to provide feedback to the user during or after a cleaning session. For example, knowing the location of the device in the mouth during a cleaning session is an important means to create enhanced feedback about the brushing behavior of the user, and/or to adapt one or more characteristics of the device according to the needs of the user. This location information can, for example, be used to determine and provide feedback about cleaning characteristics such as coverage and force.

However, tracking an oral cleaning device during guided brushing sessions have several limitations. For example, compliance of the user with the guidance is required for efficient cleaning. Additionally, for devices that track the location of the device head within the mouth based at least in part on the guided locations, the localization is typically inaccurate if the user fails to follow the guided session accurately.

Accordingly, there is a continued need in the art for methods and devices that determine a user's compliance with a guided cleaning session during use of an oral cleaning device, and that can decide whether to use localization data based in part on the determined compliance.

SUMMARY OF THE INVENTION

The present disclosure is directed to inventive methods and systems for determining a user's compliance with a guided cleaning session during use of an oral cleaning device. Applied to a system configured to provide a guided cleaning session, the inventive methods and systems enable the device or system to evaluate the reliability of localization data based on the determined compliance. Localization data will preferably only be used if the user was sufficiently compliant with the guided cleaning session. Accordingly, if the system determines that the user was not compliant, then the localization data will not be reliable and/or will not be used. The system provides a guided cleaning session to the user via visual or audible cues. While the user responds to the guidance, the system obtains sensor data from one or more sensors of the device. The system determines the user's compliance with the guidance by comparing the obtained sensor data to expected sensor data. The system then provides feedback to the user regarding non-compliance, thereby enabling compliance, and/or identifies localization data obtained during the cleaning session as unreliable.

Generally in one aspect, a method for determining a user's compliance with a guided cleaning session during use of an oral cleaning device is provided. The method includes the steps of: (i) providing an oral cleaning device comprising a sensor, a guidance generator, and a controller; (ii) providing, by the guidance generator, a guided cleaning session to the user; (iii) generating, at a first location during the guided cleaning session, sensor data from the sensor indicating a position or motion of the oral cleaning device; (iv) comparing the generated sensor data to expected sensor data for said first location; and (v) generating, based on said comparison, an estimate of the user's compliance with the guided cleaning session.

According to an embodiment, the method further includes the step of providing feedback to the user regarding the estimated compliance with the guided cleaning session. According to an embodiment, the feedback is provided in real-time. According to an embodiment, the feedback comprises an indication that the user is not complying with the guided cleaning session.

According to an embodiment, the method further includes the step of adapting the guided cleaning session based on the estimate of the user's compliance.

According to an embodiment, the method further includes the step of determining, based on the estimate of the user's compliance, whether to discard the obtained sensor data for the guided cleaning session.

According to an aspect is a cleaning device configured to determine a user's compliance with a guided cleaning session. The cleaning device includes: a sensor configured to generate sensor data at a first location during a guided cleaning session, wherein the sensor data indicates a position or motion of the cleaning device; a guidance generator configured to provide the guided cleaning session to the user, comprising a plurality of instructions; and a controller configured to: (i) compare the generated sensor data to expected sensor data for said first location; and (ii) generate, based on said comparison, an estimate of the user's compliance with the guided cleaning session.

According to an embodiment, the device further includes a user interface, wherein the controller is configured to provide feedback to the user via the user interface regarding the estimated compliance with the guided cleaning session.

According to an aspect is a cleaning device configured to determine a user's compliance with a guided cleaning session. The cleaning device includes: (i) a sensor module configured to receive from a sensor, sensor data at a first location during a guided cleaning session, wherein the sensor data indicates a position or motion of the cleaning device; (ii) a guidance generator module configured to generate the guided cleaning session, wherein the guided cleaning session comprises a plurality of instructions; (iii) a feature extraction module configured to extract one or more features from the guided cleaning session and the sensor data; and (iv) a classification model module configured to generate, based on extracted one or more features, an estimate of the user's compliance with the guided cleaning session.

According to an embodiment, the device further includes a guidance database comprising one or more stored guided cleaning sessions.

According to an embodiment, the guidance generator module is configured to adapt the guided cleaning session based on the estimate of the user's compliance.

As used herein for purposes of the present disclosure, the term "controller" is used generally to describe various apparatus relating to the operation of a stream probe apparatus, system, or method. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present disclosure discussed herein. The terms "program" or "computer program" are used herein in a generic sense to refer to any type of computer code (e.g., software or microcode) that can be employed to program one or more processors or controllers.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of a method and device for determining a user's compliance with a guided cleaning session during use of an oral cleaning device. More generally, Applicant has recognized and appreciated that it would be beneficial to provide a system configured to identify localization data obtained during an oral cleaning session as unreliable based on non-compliance with a guided cleaning session. Accordingly, the methods described or otherwise envisioned herein provide an oral cleaning device configured to provide a guided cleaning session to a user, obtain sensor data from one or more sensors of the device during the guided cleaning session, and estimate compliance with the guided cleaning session by comparing the obtained sensor data to expected sensor data. The oral cleaning device then identifies localization data obtained during the cleaning session as reliable or unreliable based on compliance or non-compliance with the guided cleaning session. According to an embodiment, the oral cleaning device comprises one or more sensors configured to obtain localization data, and optionally comprises a feedback mechanism to provide feedback to the user regarding non-compliance.

The embodiments and implementations disclosed or otherwise envisioned herein can be utilized with any oral device, including but not limited to a toothbrush, a flossing device such as a Philips AirFloss®, an oral irrigator, or any other oral device. One particular goal of utilization of the embodiments and implementations herein is to provide cleaning information and feedback using an oral cleaning device such as, e.g., a Philips Sonicare® toothbrush (manufactured by Koninklijke Philips Electronics, N.V.). However, the disclosure is not limited to a toothbrush and thus the disclosure and embodiments disclosed herein can encompass any oral device.

Figure 1:
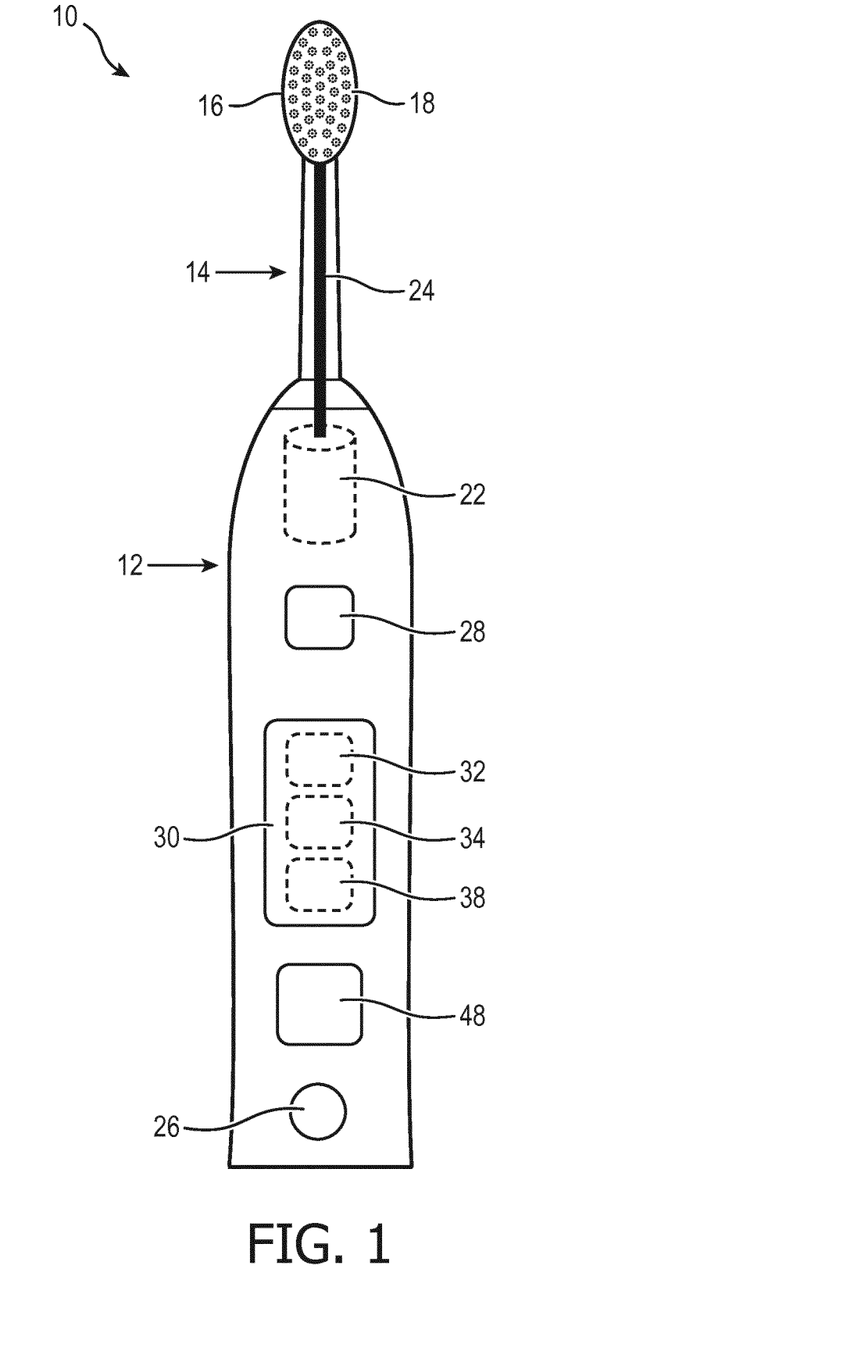
FIG. 1 is a schematic representation of an oral cleaning device, in accordance with an embodiment.

Referring to FIG. 1, in one embodiment, an oral cleaning device 10 is provided that includes a body portion 12 and a device head member 14 mounted on the body portion. Device head member 14 includes at its end remote from the body portion a head 16. Head 16 includes a face 18, which is used for cleaning.

According to an embodiment, device head member 14, head 16, and/or face 18 are mounted so as to be able to move relative to the body portion 12. The movement can be any of a variety of different movements, including vibrations or rotation, among others. According to one embodiment, device head member 14 is mounted to the body so as to be able to vibrate relative to body portion 12, or, as another example, head 16 is mounted to device head member 14 so as to be able to vibrate relative to body portion 12. The device head member 14 can be fixedly mounted onto body portion 12, or it may alternatively be detachably mounted so that device head member 14 can be replaced with a new one when a component of the device are worn out and require replacement.

According to an embodiment, body portion 12 includes a drivetrain 22 for generating movement and a transmission component 24 for transmitting the generated movements to device head member 14. For example, drivetrain 22 can comprise a motor or electromagnet(s) that generates movement of the transmission component 24, which is subsequently transmitted to the device head member 14. Drivetrain 22 can include components such as a power supply, an oscillator, and one or more electromagnets, among other components. In this embodiment the power supply comprises one or more rechargeable batteries, not shown, which can, for example, be electrically charged in a charging holder in which oral cleaning device 10 is placed when not in use.

Although in the embodiment shown in some of the Figures herein the oral cleaning device 10 is an electric toothbrush, it will be understood that in an alternative embodiment the oral cleaning device can be a manual toothbrush (not shown). In such an arrangement, the manual toothbrush has electrical components, but the brush head is not mechanically actuated by an electrical component. Additionally, the oral cleaning device 10 can be any one of a number of oral cleaning devices, such as a flossing device, an oral irrigator, or any other oral care device.

Body portion 12 is further provided with a user input 26 to activate and de-activate movement generator 22. The user input 26 allows a user to operate the oral cleaning device 10, for example to turn it on and off. The user input 26 may, for example, be a button, touch screen, or switch.

The oral cleaning device 10 includes one or more sensors 28. Sensor 28 is shown in FIG. 1 within body portion 12, but may be located anywhere within the device, including for example within device head member 14 or head 16. The sensors 28 can comprise, for example, a 6-axis or a 9-axis spatial sensor system, and can include one or more of an accelerometer, a gyroscope, and/or a magnetometer to provide readings relative to axes of motion of the oral cleaning device, and to characterize the orientation and displacement of the device. For example, the sensor 28 can be configured to provide readings of six axes of relative motion (three axes translation and three axes rotation), using for example a 3-axis gyroscope and a 3-axis accelerometer. Many other configurations are possible. Other sensors may be utilized either alone or in conjunction with these sensors, including but not limited to a pressure sensor (e.g. Hall effect sensor) and other types of sensors, such as a sensor measuring electromagnetic waveforms on a predefined range of wavelengths, a capacitive sensor, a camera, a photocell, a visible light sensor, a near-infrared sensor, a radio wave sensor, and/or one or more other types of sensors. Many different types of sensors could be utilized, as described or otherwise envisioned herein. According to an embodiment, these additional sensors provide complementary information about the position of the device with respect to a user's body part, a fixed point, and/or one or more other positions. According to an embodiment, sensor 28 is disposed in a predefined position and orientation in the oral cleaning device 10, and the head is in a fixed spatial relative arrangement to sensor 28. Therefore, the orientation and position of the head can be easily determined based on the known orientation and position of the sensor 28.

According to an embodiment, sensor 28 is configured to generation information indicative of the acceleration and angular orientation of the oral cleaning device 10. For example, the sensor system may comprise two or more sensors 28 that function together as a 6-axis or a 9-axis spatial sensor system. According to another embodiment, an integrated 9-axis spatial sensor can provide space savings in an oral cleaning device 10.

The information generated by the first sensor 28 is provided to a controller 30. Controller 30 may be formed of one or multiple modules, and is configured to operate the oral cleaning device 10 in response to an input, such as input obtained via user input 26. According to an embodiment, the sensor 28 is integral to the controller 30. Controller 30 can comprise, for example, at least a processor 32, a memory 34, and a connectivity module 38. The processor 32 may take any suitable form, including but not limited to a microcontroller, multiple microcontrollers, circuitry, a single processor, or plural processors. The memory 34 can take any suitable form, including a non-volatile memory and/or RAM. The non-volatile memory may include read only memory (ROM), a hard disk drive (HDD), or a solid state drive (SSD). The memory can store, among other things, an operating system. The RAM is used by the processor for the temporary storage of data. According to an embodiment, an operating system may contain code which, when executed by controller 30, controls operation of the hardware components of oral cleaning device 10. According to an embodiment, connectivity module 38 transmits collected sensor data, and can be any module, device, or means capable of transmitting a wired or wireless signal, including but not limited to a Wi-Fi, Bluetooth, near field communication, and/or cellular module.

According to an embodiment, oral cleaning device 10 includes a user interface 48 configured to provide information to a user before, during, and/or after a cleaning session. The user interface 48 can take many different forms, but is configured to provide guided cleaning information to a user. For example, the information can be read, viewed, heard, felt, and/or otherwise interpreted concerning where, when, and/or how to clean particular sections, segments, or areas of the interior of the mouth. According to an embodiment, the user interface 48 provides feedback to the user, such as a guided cleaning session, that includes information about where within the mouth to clean, timing, angles, pressure, and/or a variety of other cleaning parameters or characteristics. Accordingly, the user interface may be a display that provides information to the user, a haptic mechanism that provides haptic feedback to the user, a speaker to provide sounds or words to the user, or any of a variety of other user interface mechanisms.

Figure 2:
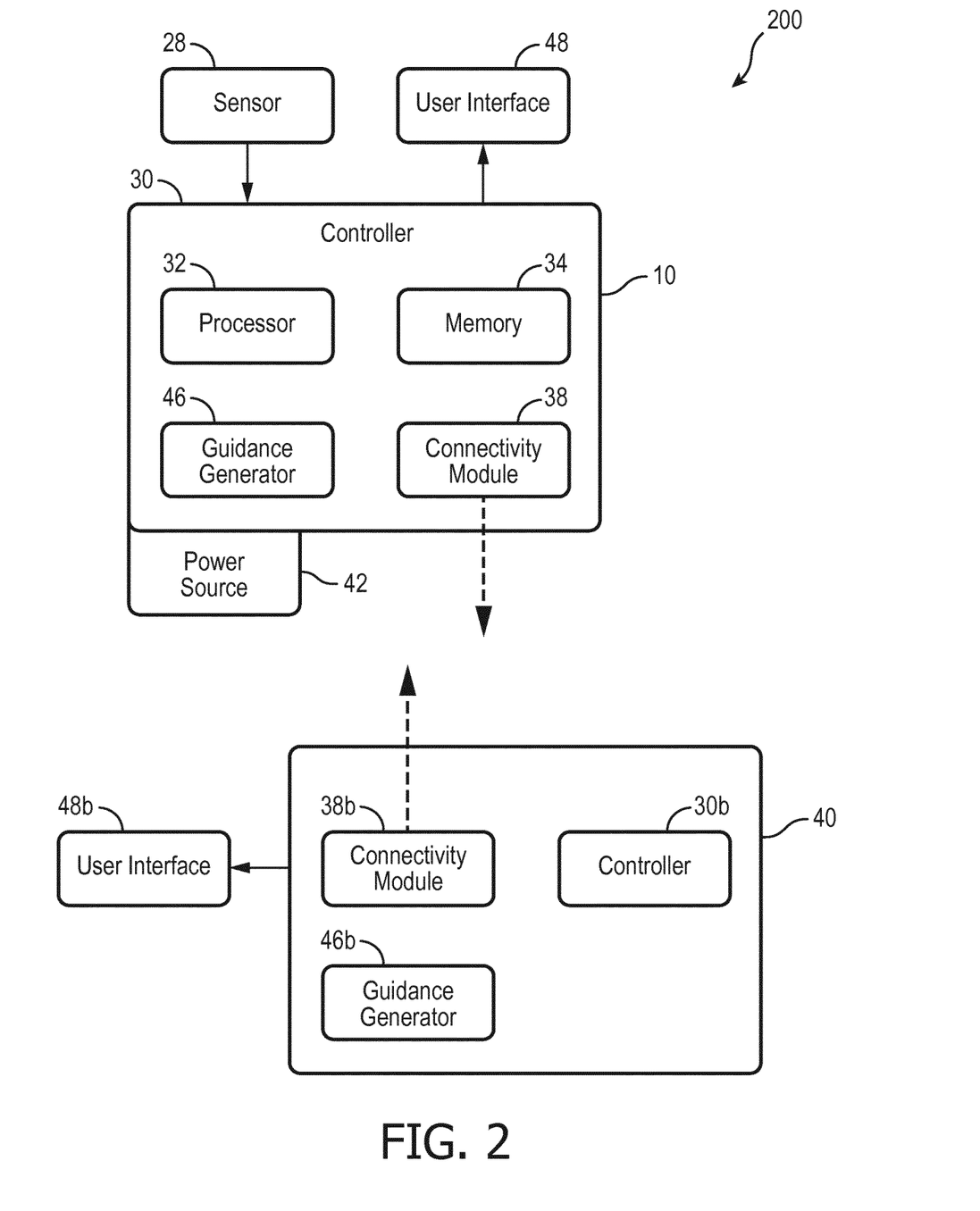
FIG. 2 is a schematic representation of an oral cleaning system, in accordance with an embodiment.

Referring to FIG. 2, in one embodiment, is an oral cleaning system 200 comprising an oral cleaning device 10 and a remote device 40 which is separate from the oral cleaning device. The oral cleaning device 10 can be any of the oral cleaning device embodiments disclosed or otherwise envisioned herein. For example, according to an embodiment, oral cleaning device 10 includes one or more sensors 28, a controller 30 comprising a processor 32, and a power source 42. Oral cleaning device 10 also comprises a connectivity module 38. The connectivity module 38 transmits collected sensor information, including to remote device 40, and can be any module, device, or means capable of transmitting a wired or wireless signal, including but not limited to a Wi-Fi, Bluetooth, near field communication, and/or cellular module. Oral cleaning device 10 also comprises a user interface configured to receive and/or communicate information to the user. The oral cleaning device also comprises a guidance generator 46 configured to generate guidance instructions to the user before, during, and/or after a cleaning session. The guidance instructions can be extracted from or based on, for example, a predetermined cleaning routine, and/or from information about one or more previous cleaning sessions.

According to an embodiment, remote device 40 can be any device configured to or capable of communicating with oral cleaning device 10. For example, remote device 40 may be a cleaning device holder or station, a smartphone device, a computer, a tablet, a server, or any other computerized device. According to an embodiment, remote device 40 includes a communications module 38*b* which can be any module, device, or means capable of receiving a wired or wireless signal, including but not limited to a Wi-Fi, Bluetooth, near field communication, and/or cellular module. Device 40 also includes a controller 30*b* which uses the received information from sensor 28 sent via connectivity module 38.

According to an embodiment, remote device 40 includes a user interface 48*b* configured to provide guided cleaning information to a user, such as information about where within the mouth to clean, timing, angles, pressure, and/or a variety of other cleaning parameters or characteristics. User interface 48*b* can take many different forms, such as a haptic interface, a visual interface, an audible interface, or other forms.

According to an embodiment, remote device 40 can also include a guidance generator 46*b* configured to generate guidance instructions to the user before, during, and/or after a cleaning session. The guidance instructions can be extracted from or based on, for example, a predetermined cleaning routine, and/or from information about one or more previous cleaning sessions.

For example, remote device 40 can be the user's smartphone, or a portable instruction device. The remote device generates cleaning instructions via the guidance generator 46*b*, which could be a smartphone app, and provides the cleaning instructions to the user via the speakers and/or the visual display. The oral cleaning device 10 obtains sensor data from sensor 28 during the guided cleaning session representative of localization data for the oral cleaning device, and sends that data to controller 30 of the oral cleaning device and/or controller 30*b* of the remote device. The receiving controller(s) compares the obtained sensor data to expected sensor data, which can be stored in local or remote memory, in order to determine the user's compliance with the cleaning session, in real-time and/or after the completion of the cleaning session. The controller then categorizes the localization data obtained during the cleaning session as reliable or unreliable based on compliance or non-compliance with the guided cleaning session. According to an embodiment, system 200 provides feedback to the user, either in real-time and/or after the completion of the cleaning session, via user interface 48 of the oral cleaning device and/or user interface 48*b* of the remote device 40.

Figure 3:
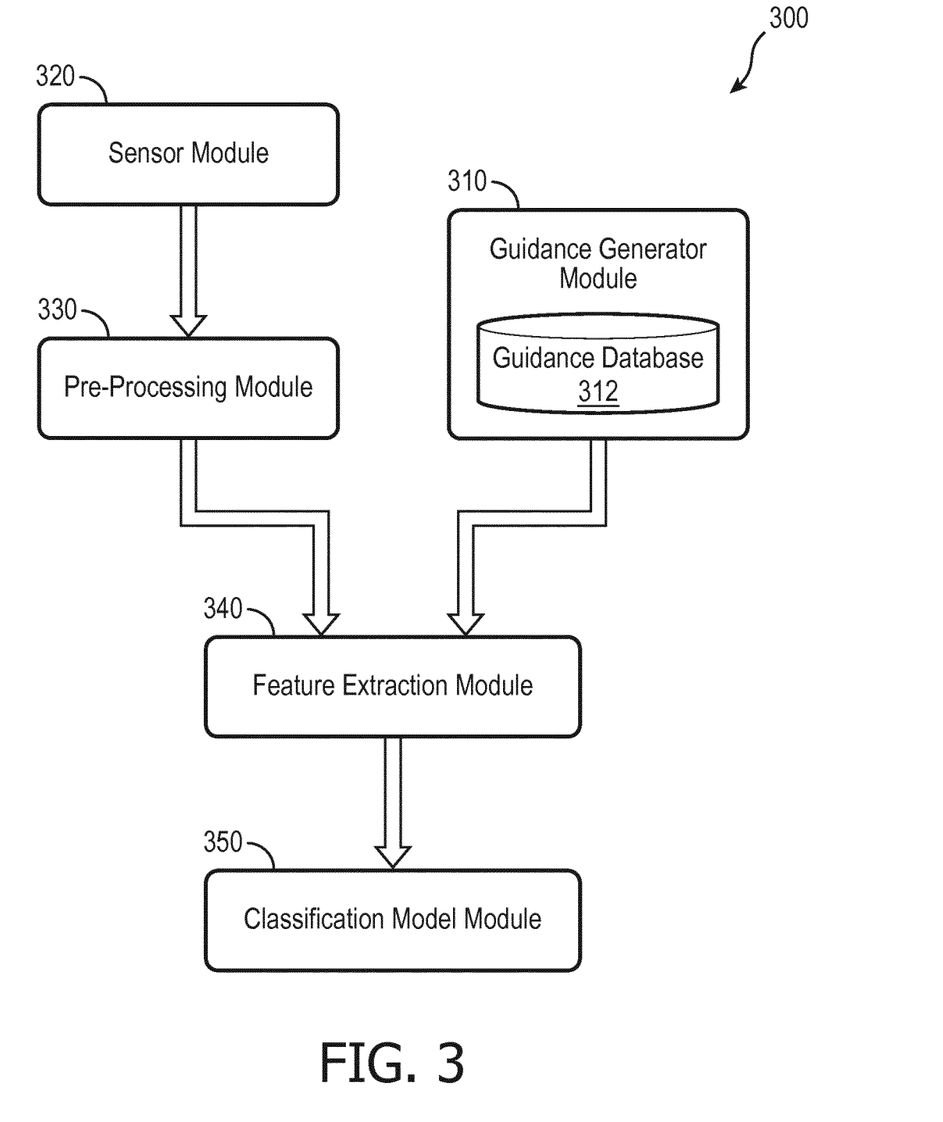
FIG. 3 is a schematic representation of an oral cleaning system, in accordance with an embodiment.

Referring to FIG. 3, in one embodiment, is an oral cleaning system 300. Oral cleaning system 300 is an embodiment of oral cleaning device 10, which can be any of the oral cleaning device embodiments disclosed or otherwise envisioned herein. According to an embodiment of oral cleaning system 300, guidance generator module 310 of oral cleaning system 300 creates one or more cleaning instructions for the user before, during, and/or after a cleaning session. The guidance instructions can be extracted from or based on, for example, a predetermined cleaning routine, and/or from information about one or more previous cleaning sessions. For example, guidance generator module 310 may comprise or be in wired and/or wireless communication with a guidance database 312 comprising information about one or more cleaning routines.

Sensor module 320 of oral cleaning system 300 directs or obtains sensor data from sensor 28 of the device, which could be, for example, an Inertial Measurement Unit (IMU) consisting of a gyroscope, accelerometer, and/or magnetometer. The sensor data contains information about the device's movements.

Pre-processing module 330 of oral cleaning system 300 receives and processes the sensor data from sensor module 320. According to an embodiment, pre-processing consists of steps such as filtering to reduce the impact of motor driving signals on the motion sensor, down-sampling to reduce the communication bandwidth, and gyroscope offset calibration. These steps improve and normalize the obtained sensor data.

Feature extraction module 340 of oral cleaning system 300 generates one or more features from the pre-processed sensor signals from pre-processing module 330, and from the guidance instructions from guidance generator module 310. These features provide information related to the location of head 16 within the user's mouth. According to an embodiment, a feature can be computed by aggregating signals over time. For example, features can be computed at the end of a cleaning session, at the end of every guidance interval, every x number of seconds, or at other intervals or in response to other events.

The data from a typical cleaning session comprises thousands of sensor measurements. The feature extraction module 340 applies signal processing techniques to these sensor measurements in order to obtain fewer values, called features, which contain the relevant information necessary to predict whether or not the user was compliant to guidance. These features are typically related to the user's motions and to the device's orientation. Among other features, the feature extraction module 340 can generate the following features: (i) the average device orientation; (ii) the variance of the device's orientation; (iii) the energy in the signals from the motion sensor 28; (iv) the energy in the motion sensor's signals per frequency band; (v) the average force applied; (vi) the duration of the cleaning session, and many more.

According to an embodiment, the first step in feature extraction is estimation of the orientation of oral cleaning device 10 with respect to the user's head. Based on signals from the one or more sensors 28, it is possible to determine or estimate the orientation of the device with respect to the world. Furthermore, information about the orientation of the user's head can be determined or estimated from the guidance intervals during which the user was expected to clean at the molar segments. During these intervals, for example, the average direction of the main axis of the device is aligned with the direction of the user's face. Practical tests demonstrate that the average orientation of the device is strongly related to the area of the mouth being cleaned. For example, when cleaning the upper jaw the average orientation of the device is upwards, and when brushing the lower jaw the average orientation of the device is downwards.

Similarly, the main axis of the oral cleaning device points toward the left (right) when the user is cleaning the right (left) side of the mouth.

The relationship between the average orientation of the device and the area of the mouth being cleaned can be exploited to evaluate compliance with a guided cleaning session. For example, when the user cleans the upper jaw, a positive value is expected for the up/down variable of the device. When the user cleans the lower jaw, a negative value is expected for the up/down variable of the device. The difference between the up/down variable's value during upper jaw guidance and lower jaw guidance should, therefore, be a positive number if the user complied with the guidance.

Classification model module 350 of oral cleaning system 300 determines or predicts a level, percent, or other amount of user compliance with the guidance signal, based on the calculated signal features. According to an embodiment, the system determines the user's compliance with the guidance by comparing the obtained sensor data to expected sensor data.

Given a set of features from the feature extraction module 340, the classification model module 350 may utilize a regression or classification model to estimate the compliance with the guidance. For example, the model may be linear regression, generalized linear models, support vector machines, logistic regression, or any of a variety of other models. According to an embodiment, the parameters of the model are learned from training data, such as a set of labeled examples including data from lab tests during which the user's degree of compliance with guidance was accurately measured. According to an embodiment, once the user's degree of compliance with the guidance signal is estimated for a given cleaning session, a decision can be made about whether or not the data should be processed further.

Figure 4:
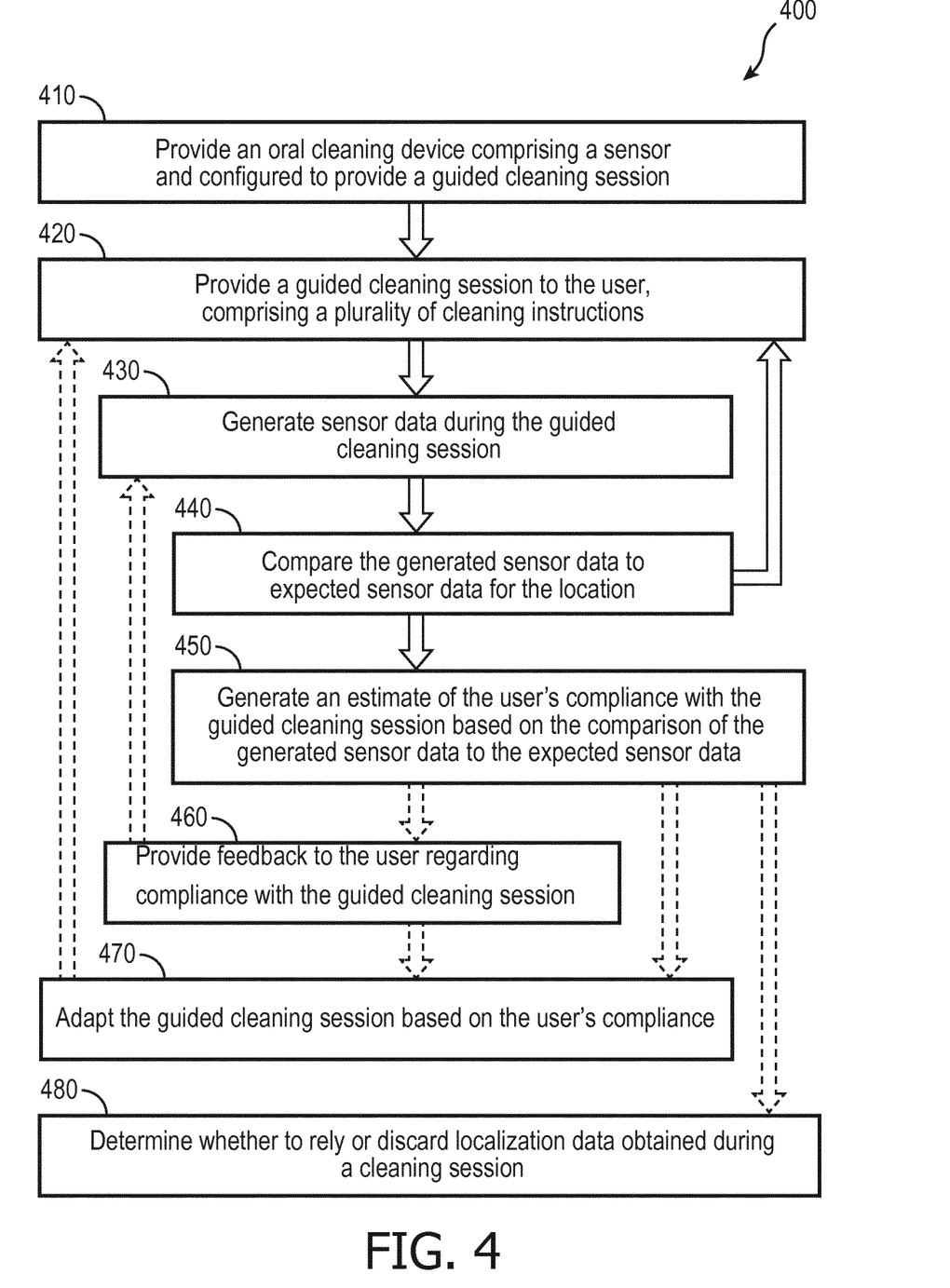
FIG. 4 is a flowchart of a method for determining a user's compliance with a guided cleaning session during use of an oral cleaning device, in accordance with an embodiment.

Referring to FIG. 4, in one embodiment, is a flowchart of a method 400 for determining a user's compliance with a guided cleaning session during use of an oral cleaning device. In step 410, an oral cleaning device 10 is provided. Alternatively, an oral cleaning system with device 10 and remote device 40 may be provided. The oral cleaning device or system can by any of the devices or systems described or otherwise envisioned herein. For example, oral cleaning device comprises a sensor 28, a guidance generator 46, a user interface 48, and a controller 30.

At step 420 of the method, the guidance generator 46 provides a guided cleaning session to the user. The guided cleaning session can be preprogrammed and stored in guidance database 312, for example, or can be a learned guided cleaning session. The guided cleaning session includes a plurality of cleaning instructions to the user, and can include information about where to clean, how to clean, and other information. The guided cleaning session can be timed and/or dependent upon sensor data. According to an embodiment, the guided cleaning is implicit, wherein the user is directed to follow a certain pattern but only receives a trigger to another area without receive information about which area to go next.

At step 430 of the method, the sensor 28 of oral cleaning device 10 generates sensor data at a first location during the guided cleaning session. The sensor data is indicative of a position, motion, orientation, or other parameter or characteristic of the oral cleaning device at that first location. The sensor data is stored or sent to the controller 30 of the oral cleaning device and/or the controller 30*b* of the remote device. Accordingly, the controller obtains sensor data indicating a position or motion of the oral cleaning device.

At step 440 of the method, the controller compares the generated sensor data to the expected sensor data for the first location. For example, as described herein, the system may comprise information about expected sensor data for a plurality of locations within the mouth. This information can be preprogrammed, or can be learned from one or more cleaning sessions, including a guided cleaning session.

At step 450 of the method, based on the comparison of the generated sensor data to the expected sensor data, the controller generates an estimate of the user's compliance with the guided cleaning session. According to one embodiment, as described herein, the system comprises a regression or classification model that analyzes one or more of the features generated by a feature extraction module from the sensor data and guided cleaning session.

At optional step 460 of the method, the device or system provides feedback to the user regarding the estimated compliance with the guided cleaning session. For example, the feedback may be provided to the user in real-time and/or otherwise during or after a cleaning session. The feedback may comprise an indication that the user is not complying with the instructions, including how the user is varying from the instructions, or how the user can change to comply with the instructions. Feedback generated by oral cleaning device 10 and/or remote device 40 can be provided to the user in any of a variety of different ways, including via visual, written, audible, haptic, or other types of feedback.

At optional step 470 of the method, the device or system adapts the guided cleaning session based on the estimate of the user's compliance. For example, the system may determine that the user must re-clean a certain area of the mouth based on non-compliance with instructions when cleaning that portion of the mouth. As another example, the system may determine that the user should adjust the angle of the device and will provide the adjustment instructions during the guided cleaning session. The adaptation or adjustment is designed or configured to return the user to compliance with the guided cleaning session.

At optional step 480 of the method, the device or system determines whether to rely on or discard localization data. For example, if the user was non-compliant with the guided cleaning session, the localization data will have a greater amount of errors and should be discarded, or should not be utilized for feedback and further analysis. If the user was compliant with the guided cleaning session, the localization data will have fewer errors and can be relied upon and used for feedback and further analysis. According to an embodiment, the compliance checking functionality is used at the end of every cleaning session so that each session is labeled as compliant or non-compliant. This enables the exclusion of non-compliant cleaning sessions from feedback given to the user. Moreover, the data from the complete cleaning session will be available for feature extraction.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. An oral cleaning device configured to determine a user's compliance with a guided cleaning session, the oral cleaning device comprising:
    a sensor configured to generate sensor data at a first location during a guided cleaning session, wherein the sensor data indicates a position or motion of the oral cleaning device;
    a guidance generator configured to provide the guided cleaning session to the user, comprising a plurality of instructions;
    a controller configured to: (i) compare the generated sensor data to expected sensor data for said first location; and (ii) generate, based on said comparison, an estimate of the user's compliance with the guided cleaning session; and (iii) evaluate a reliability of the generated sensor data based on the estimate of the user's compliance with the guided cleaning session.

2. The oral cleaning device of claim 1, further comprising a user interface, wherein the controller is configured to provide feedback to the user via the user interface regarding the estimated compliance with the guided cleaning session.

3. The oral cleaning device of claim 2, wherein the feedback is provided in real-time.

4. The oral cleaning device of claim 2, wherein the feedback comprises an indication that the user is not complying with the guided cleaning session.

5. The oral cleaning device of claim 1, wherein the guidance generator is configured to adapt the guided cleaning session based on the estimate of the user's compliance.

6. The oral cleaning device of claim 1, wherein the controller is configured to determine, based on the estimate of the user's compliance, whether to discard the obtained sensor data for the guided cleaning session.

7. An oral cleaning device configured to determine a user's compliance with a guided cleaning session, the oral cleaning device comprising:
    a sensor module configured to receive from a sensor data at a first location during a guided cleaning session, wherein the sensor data indicates a position or motion of the oral cleaning device;
    a guidance generator module configured to generate the guided cleaning session, wherein the guided cleaning session comprises a plurality of instructions;
    a feature extraction module configured to extract one or more features from the guided cleaning session and the sensor data; and
    a classification model module configured to generate, based on extracted one or more features, an estimate of the user's compliance with the guided cleaning session and evaluate a reliability of the generated sensor data based on the estimate of the user's compliance with the guided cleaning session.

8. The oral cleaning device of claim 7, further comprising a guidance database comprising one or more stored guided cleaning sessions.

9. The oral cleaning device of claim 7, wherein the guidance generator module is configured to adapt the guided cleaning session based on the estimate of the user's compliance.

10. A method for determining a user's compliance with a guided cleaning session during use of an oral cleaning device, the method comprising the steps of:

providing an oral cleaning device comprising a sensor, a guidance generator, and a controller;

providing, by the guidance generator, a guided cleaning session to the user;

generating, at a first location during the guided cleaning session, sensor data from the sensor indicating a position or motion of the oral cleaning device;

comparing the generated sensor data to expected sensor data for said first location; and generating, based on said comparison, an estimate of the user's compliance with the guided cleaning session; and evaluating a reliability of the sensor data based on the estimate of the user's compliance with the guided cleaning session.

11. The method of claim 10, further comprising the step of providing feedback to the user regarding the estimated compliance with the guided cleaning session.

12. The method of claim 11, wherein the feedback is provided in real-time.

13. The method of claim 11, wherein the feedback comprises an indication that the user is not complying with the guided cleaning session.

14. The method of claim 10, further comprising the step of adapting the guided cleaning session based on the estimate of the user's compliance.

15. The method of claim 10, further comprising the step of determining, based on the estimate of the user's compliance, whether to discard the obtained sensor data for the guided cleaning session.

* * * * *